Dec. 24, 1935. A. H. FISKE ET AL 2,025,503
PROCESS OF PREPARING THIOTETRAPHOSPHATES AND PRODUCT THEREOF
Filed Dec. 7, 1934
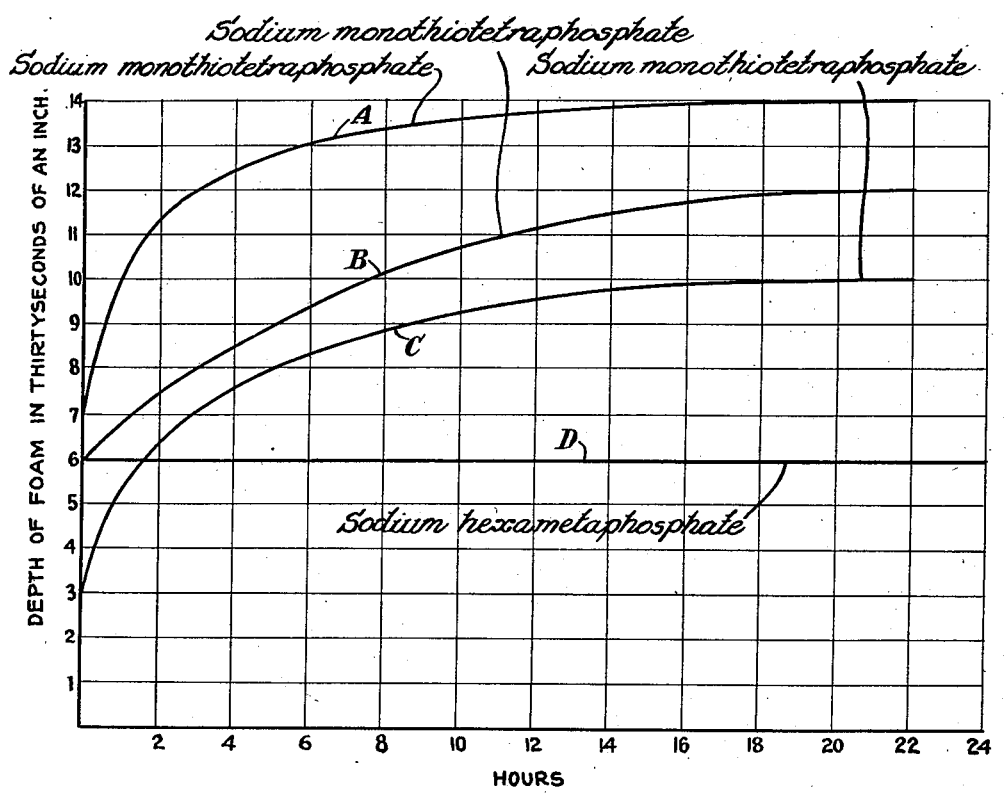
INVENTORS
Augustus H. Fiske and
Charles S. Bryan
BY
Arthur Wright
ATTORNEY Patented Dec. 24, 1935

2,025,503

UNITED STATES PATENT OFFICE 2,025,503

PROCESS OF PREPARING THIOTETRAPHOSPHATES AND PRODUCT THEREOF

Augustus H. Fiske, Warren, and Charles S. Bryan, Providence, R. I., assignors to Rumford Chemical Works, Rumford, R. I.

Application December 7, 1934, Serial No. 756,456

24 Claims. (Cl. 23—106)

Our invention relates particularly to the production of thiotetraphosphates and the product thereof, but has relation especially to the production of monothiotetraphosphates of the alkali metals.

The object of our invention is to provide a process and product thereof by means of which thiotetraphosphates of the alkali metals may be produced. A further object is to carry out the process by the use merely of materials which are inexpensive and readily obtainable in large quantities.

While our invention is capable of embodiment in many different forms, we have described only certain ways of carrying out the same hereinafter.

For example, in carrying out our invention, the equivalent of 4 molecules of a metaphosphate, as for instance monosodium metaphosphate $NaPO_3$, instead of which the corresponding salt of potassium or any other metal may be used, if desired, or any of their polymeric forms, the same being preferably finely ground, is mixed with the equivalent of 1 molecule of a sulphide of a metal, for instance sodium sulphide $Na_2S$, or what is known commercially as sodium sulphide, or the corresponding salt of potassium or any other metal, preferably also in a fine state of subdivision as a result of having been finely ground. Where commercial salts are used an allowance will be made, of course, for the possible impurities present in calculating the weights used. These materials, after they have been thoroughly mixed together, are melted, preferably at a temperature of 150° C., although the reaction can be carried out also at much higher and lower temperatures, if desired, for instance with a range of temperatures from 100° C. to 700° C., or more. When the heat is thus applied, after the melting a sintering or solidification takes place, thus obtaining a material which is hard at the same temperatures, of maximum effectiveness and strength which is a physically and chemically homogeneous compound, the product being obtained probably in accordance with the following equation,—

$$4NaPO_3 + Na_2S = Na_6P_4O_{12}S$$

the product being monothiotetraphosphate of sodium, and which is a sodium salt of the tetraphosphoric acid, the constitution of which is given by Roscoe and Schorlemmer in their Treatise on Chemistry, Vol. 1, 1905, page 656, and in which one of the oxygen atoms has been substituted by sulphur.

The ordinary commercial sodium sulphide is dark red in color, whereas the resulting sodium monothiotetraphosphate is a dark yellowish green powder which is freely soluble in water and, as in the case of thiophosphates generally, gradually gives a slightly milky precipitate of sulphur with a slight evolution of hydrogen sulphide $H_2S$ upon being dissolved in water. However, this slight reaction in the presence of water does not at all interfere with the various uses of the material to which it may be effectively and advantageously applied. Also, the effectiveness of the water softening action is found to increase at least over a period of a day after it is applied, as shown in the accompanying figure of the drawing showing the increasing depth of foam formed by different examples of our monothiotetraphosphate materials in curves A, B and C, as compared with other materials as shown by the straight line D referring respectively to A. Sodium monothiotetraphosphate made by heating to 150° C.

B. Sodium monothiotetraphosphate made by fusion at bright red heat.

C. Another sodium monothiotetraphosphate made by fusion at bright red heat.

D. Commercial sodium hexametaphosphate.

The yellowish green powder may be fused to a colorless glassy product, if desired. There are many advantageous uses to which these compounds may be applied, as, for instance,—

As a water softener by keeping the alkali earth bases in a soluble condition.

In laundries as to save soap by combining with the alkali earth bases in the washing water.

In deliming leather as in the tanning industry.

In dissolving the lime compounds which may occur in soiled textiles.

To prevent deposits of alkali earth salts forming in hot water systems.

To prevent deposits of alkali earth compounds in steam boilers and their feed lines.

To prevent deposits of alkali earth compounds in automobile water cooling systems.

To prevent the formation of alkali earth bases as precipitates in the water to be frozen in artificial ice machines.

To prevent the formation of alkali earth precipitates on the outside of cans from the cooling water of the canning industry.

To prevent streaky dyeing in textiles by keeping any alkali earth compounds in a condition of solubility.

Preventing the formation of soap spots on the cloth in dyeing.

To clean cement or brick walls from lime deposits.

As a softener for water in washing living animals or in baths for human beings.

For cleaning or washing dishes.

For softening water in which anything may be washed and thus saving soap.

Washing rayon, for instance.

Scouring wool.

Kier boiling in bleacheries.

Boiling off silk.

Causing increased penetration of dye in textiles by cleaning off traces of alkali earth compounds.

While we have described our invention above in detail we wish it to be understood that many changes may be made therein without departing from the spirit of the same.

We claim:

1. A process which comprises reacting with the application of heat approximately four molecules of an alkali metal metaphosphate with approximately one molecule of an alkali metal sulphide to produce an alkali metal thiotetraphosphate.

2. A process which comprises reacting with the application of heat approximately four molecules of a monoalkali metal metaphosphate with approximately one molecule of an alkali metal sulphide to produce an alkali metal thiotetraphosphate.

3. A process which comprises reacting with the application of heat approximately four molecules of a sodium metaphosphate with approximately one molecule of sodium sulphide to produce a water soluble thiotetraphosphate.

4. A process which comprises reacting with the application of heat approximately four molecules of monosodium metaphosphate with approximately one molecule of sodium sulphide to produce a water-soluble thiotetraphosphate.

5. A process which comprises reacting with the application of heat approximately four molecules of an alkali metal metaphosphate with approximately one molecule of an alkali metal sulphide to produce an alkali metal monothiotetraphosphate.

6. A process which comprises reacting with the application of heat approximately four molecules of a monoalkali metal metaphosphate with approximately one molecule of an alkali metal sulphide to produce an alkali metal monothiotetraphosphate.

7. A process which comprises reacting with the application of heat approximately four molecules of a sodium metaphosphate with approximately one molecule of sodium sulphide to produce a water-soluble monothiotetraphosphate.

8. A process which comprises reacting with the application of heat approximately four molecules of monosodium metaphosphate with approximately one molecule of sodium sulphide to produce a water-soluble monothiotetraphosphate.

9. A process which comprises reacting approximately four molecules of an alkali metal metaphosphate with approximately one molecule of an alkali metal sulphide, both in powdered form, with the application of heat, to produce an alkali metal thiotetraphosphate by sintering.

10. A process which comprises reacting approximately four molecules of a monoalkali metal metaphosphate with approximately one molecule of an alkali metal sulphide, both in powdered form, with the application of heat, to produce an alkali metal thiotetraphosphate by sintering.

11. A process which comprises reacting approximately four molecules of a sodium metaphosphate with approximately one molecule of sodium sulphide, both in powdered form, with the application of heat, to produce a water-soluble thiotetraphosphate by sintering.

12. A process which comprises reacting approximately four molecules of monosodium metaphosphate with approximately one molecule of sodium sulphide, both in powdered form, with the application of heat, to produce a water-soluble thiotetraphosphate by sintering.

13. A thiotetraphosphate of an alkali metal base.

14. A monothiotetraphosphate of an alkali metal base.

15. A thiotetraphosphate of sodium.

16. A monothiotetraphosphate of sodium.

17. A thiotetraphosphate of sodium of a dark yellowish green color.

18. A monothiotetraphosphate of sodium of a dark yellowish green color.

19. A thiotetraphosphate of sodium of a dark yellowish green color, freely soluble in water with the formation of a slight milky precipitate.

20. A monothiotetraphosphate of sodium of a dark yellowish green color, freely soluble in water with the formation of a slight milky precipitate.

21. A thiotetraphosphate of sodium of a glassy colorless character.

22. A monothiotetraphosphate of sodium of a glassy colorless character.

23. A thiotetraphosphate of sodium of a glassy colorless character, freely soluble in water with the formation of a slight milky precipitate.

24. A monothiotetraphosphate of sodium of a glassy colorless character, freely soluble in water with the formation of a slight milky precipitate.

AUGUSTUS H. FISKE.
CHARLES S. BRYAN.